(12) United States Patent
Lee et al.

(10) Patent No.: US 10,581,044 B2
(45) Date of Patent: Mar. 3, 2020

(54) SECONDARY BATTERY WHICH DETECTS DISPLACEMENT OF GAS DISCHARGE PART TO PREVENT BATTERY CELL SWELLING, SYSTEM FOR CHARGING SECONDARY BATTERY, AND METHOD FOR MANUFACTURING SECONDARY BATTERY

(71) Applicant: LG CHEM, LTD., Seoul (KR)

(72) Inventors: Wontae Lee, Daejeon (KR); Yanglim Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 104 days.

(21) Appl. No.: 15/579,713

(22) PCT Filed: Aug. 12, 2016

(86) PCT No.: PCT/KR2016/008880
§ 371 (c)(1),
(2) Date: Dec. 5, 2017

(87) PCT Pub. No.: WO2017/078253
PCT Pub. Date: May 11, 2017

(65) Prior Publication Data
US 2018/0183027 A1    Jun. 28, 2018

(30) Foreign Application Priority Data

Nov. 2, 2015    (KR) .......................... 10-2015-0153078

(51) Int. Cl.
*H01M 2/12*    (2006.01)
*H01M 2/34*    (2006.01)
(Continued)

(52) U.S. Cl.
CPC ......... *H01M 2/1241* (2013.01); *H01M 2/021* (2013.01); *H01M 2/0212* (2013.01);
(Continued)

(58) Field of Classification Search
CPC .. H01M 2/1241; H01M 2/021; H01M 2/0287; H01M 2/34; H01M 10/0585;
(Continued)

(56) References Cited

U.S. PATENT DOCUMENTS

| 8,986,861 B2 | 3/2015 | Murayama et al. |
| 2004/0038126 A1* | 2/2004 | Gu ........................ H01M 2/021 |
| | | 429/162 |

(Continued)

FOREIGN PATENT DOCUMENTS

| CN | 101904030 A | 12/2010 |
| JP | 10-55792 A | 2/1998 |

(Continued)

OTHER PUBLICATIONS

European Search Report for Appl. No. 16862272.8 dated Apr. 16, 2018.

(Continued)

*Primary Examiner* — Jonathan G Jelsma
(74) *Attorney, Agent, or Firm* — Birch, Stewart, Kolasch & Birch, LLP

(57) ABSTRACT

The present invention relates to a secondary battery, which detects a displacement of a gas discharging part and prevents battery cell swelling, and a system for charging a secondary battery and a method of manufacturing a secondary battery. The secondary battery include a gas discharging part, which is positioned at one end of a sealing part that seals an electrode assembly and induces a discharge of gas by weakening bonding force more than other attachment portions of the sealing part, and a detecting part which detects a displacement generated in the gas discharging part and generates an electric signal.

12 Claims, 4 Drawing Sheets

(51) Int. Cl.
  *H01M 10/48* (2006.01)
  *H01M 10/44* (2006.01)
  *H01M 2/02* (2006.01)
  *H01M 10/0585* (2010.01)
  *H02J 7/00* (2006.01)

(52) U.S. Cl.
  CPC .......... *H01M 2/0287* (2013.01); *H01M 2/34* (2013.01); *H01M 10/0585* (2013.01); *H01M 10/44* (2013.01); *H01M 10/445* (2013.01); *H01M 10/48* (2013.01); *H02J 7/0029* (2013.01); *H01M 2200/00* (2013.01); *H01M 2200/103* (2013.01)

(58) Field of Classification Search
  CPC .... H01M 10/44; H01M 10/445; H01M 10/48; H02J 7/0029
  See application file for complete search history.

(56) References Cited

U.S. PATENT DOCUMENTS

2011/0104527 A1    5/2011  Choi et al.
2013/0122336 A1*   5/2013  Park .................... H01M 2/0212
                                                            429/82
2015/0132621 A1    5/2015  Henrici et al.
2016/0064780 A1*   3/2016  Jarvis ................ H01M 10/4257
                                                            429/50

FOREIGN PATENT DOCUMENTS

| JP | 11-86823 A | 3/1999 |
| JP | 2000-100399 A | 4/2000 |
| JP | 2005-222872 A | 8/2005 |
| JP | 2007-109455 A | 4/2007 |
| JP | 2009-43592 A | 2/2009 |
| JP | 2013-51121 A | 3/2013 |
| KR | 2003-0035185 A | 5/2003 |
| KR | 10-2006-0087185 A | 8/2006 |
| WO | WO 2012/073770 A1 | 6/2012 |

OTHER PUBLICATIONS

International Search Report issued in PCT/KR2016/008880 (PCT/ISA/210), dated Nov. 22, 2016.

* cited by examiner

[Figure 1]
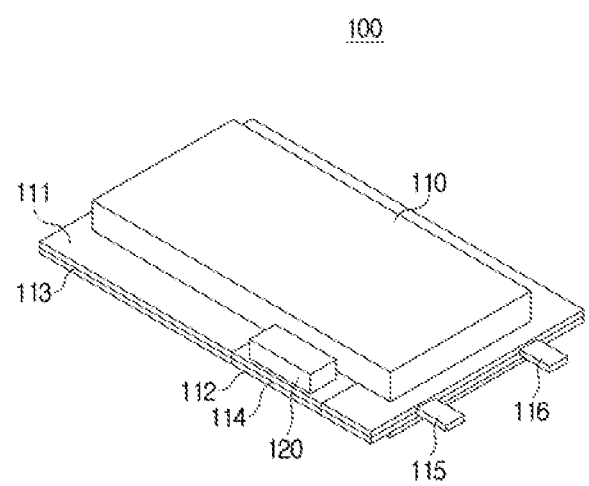

[Figure 2]
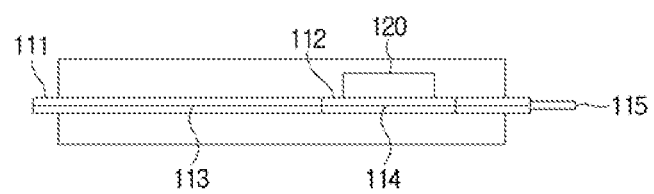

[Figure 3]
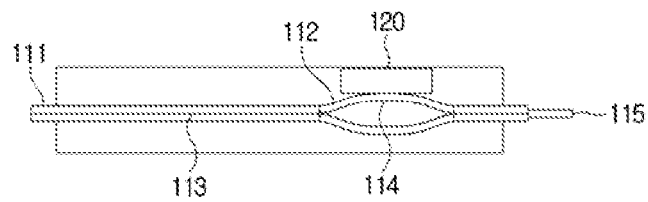

[Figure 4]
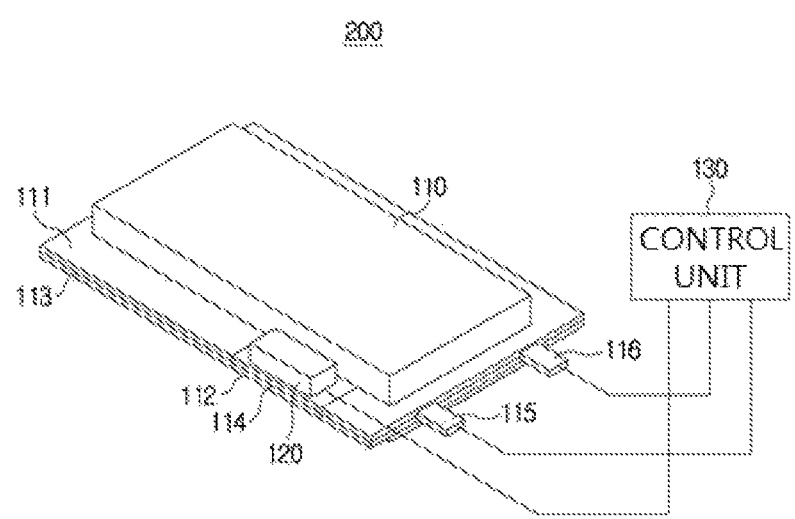

SECONDARY BATTERY WHICH DETECTS DISPLACEMENT OF GAS DISCHARGE PART TO PREVENT BATTERY CELL SWELLING, SYSTEM FOR CHARGING SECONDARY BATTERY, AND METHOD FOR MANUFACTURING SECONDARY BATTERY

TECHNICAL FIELD

This application claims priority to and the benefit of Korean Patent Application No. 10-2015-0153078 filed in the Korean Intellectual Property Office on Nov. 2, 2015, the entire contents of which are incorporated herein by reference.

The present invention relates to a secondary battery, which detects a displacement of a gas discharging part and prevents swelling of a cell, and a system and a method of charging a secondary battery, and more particularly, to a secondary battery, which includes a gas discharging part, which is positioned at one end of a sealing part that seals an electrode assembly and induces a discharge of gas by weakening bonding force compared to other attachment portions of the sealing part, and a detecting part, which detects a displacement generated in the gas discharging part and generates an electric signal, to induce a discharge of gas inside a battery and control the quantity of charging current of the battery and secure stability of the secondary battery, thereby preventing battery cell swelling by detecting a displacement of the gas discharging part, and a system for charging a secondary battery and a method of manufacturing a secondary battery.

BACKGROUND ART

A lithium secondary battery is fabricated by assembling a cathode material, an anode material, an electrolyte, and a separation film, and does not use heavy metal, such as mercury (Hg) or cadmium (Cd), so that the lithium secondary battery is environmentally friendly, has a higher output voltage than that of an existing battery, and has a large capacity. Owing to a characteristic of a light lithium atom, the lithium secondary battery is widely used in a superlight electronic product, such as a mobile phone and a camcorder, and recently, the use of the lithium secondary battery is expanded to an electric vehicle and a usage, such as energy storage, according to the development of a large capacity technology.

The lithium secondary battery is divided into a general lithium ion battery which uses a liquid electrolyte and a lithium ion polymer battery which uses an electrolyte in a form of gel or a solid polymer according to the kind of electrolyte. Further, the lithium secondary battery is divided into a cylindrical shape and a square shape according to a shape of the battery.

A lithium ion polymer battery adopting a method of using a completely solid-type electrolyte among the lithium ion polymer batteries is not generally used well because of low ion conductivity of the electrolyte.

The lithium ion polymer battery does not have an electrolyte leakage problem or has a simple method of preventing a leakage of the electrolyte, compared to a general lithium ion battery using a liquid electrolyte. The lithium ion polymer battery uses a metal can or has a pouch form formed with multiple layers of metal foil and a polymer, thereby preventing an electrolyte from leaking.

When a pouch is used as a battery case, the lithium ion polymer battery has an advantage in that it is possible to remarkably decrease weight of the battery compared to the case where the metal can is used. Aluminum is generally used as a metal for foil forming an exterior layer of the pouch. A polymer layer forming an interior layer of the pouch is mainly formed of polypropylene, which protects the metal foil from the electrolyte and prevents a cathode, an anode, and electrode taps from being short-circuited.

In the lithium secondary battery, lithium ions (Li+) move from a cathode to an anode during discharging, and lithium ions (Li+) move from the anode to the cathode during charging, so that the lithium secondary battery accompanies an electrochemical reaction inside the battery. According to the electrochemical reaction, the lithium secondary battery is repeatedly contracted and expanded, and discharges gas.

Further, in the secondary battery, when an overcurrent flows by overdischarging or a short-circuit, a temperature inside the battery increases and a phase change is generated from the liquid electrolyte to gas, and for this reason, a pressure inside the battery increases.

In the case of the pouch-type lithium secondary battery, it is possible to decrease weight of the battery as described above, but the pouch-type lithium secondary battery has a problem in that strength of the foil-type metal layer forming the exterior layer of the pouch is weak, so that it is impossible to sufficiently endure a pressure of the internal gas. Accordingly, when the battery is expanded by gas generated inside the battery, performance of the battery deteriorates and as a result, a life of the battery is decreased.

Particularly, a lithium cobalt oxide ($LiCoO_2$) currently widely used in the lithium secondary battery has an advantage of high capacity and output, but has a characteristic that a material structure is unstable during charging or discharging, so that when an overcurrent flows by a short-circuit and the like, this may lead to an explosion and a fire.

In order to solve the problem due to the generation of the gas inside the lithium secondary battery, various research has been currently conducted. However, in the existing research, only a means for discharging gas inside the battery is simply provided, or a strain gauge is directly mounted in an electrode assembly, so that a thickness of the battery is increased.

Accordingly, research for maintaining the advantages of the pouch-type secondary battery, efficiently removing gas generated inside the battery, and minimizing a battery cell swelling phenomenon and controlling charging by detecting a deformation of a battery case due to the gas generated inside the battery at an early stage has been emphasized than ever.

DETAILED DESCRIPTION OF THE INVENTION

Technical Problem

An object of the present invention is to provide a secondary battery, which includes a gas discharging part, which is positioned at one end of a sealing part that seals an electrode assembly and induces a discharge of gas by weakening bonding force compared to other attachment portions of the sealing part, and a detecting part, which detects a displacement generated in the gas discharging part and generates an electric signal, to induce a discharge of gas inside a battery and control the quantity of charging current of the battery and secure stability of the secondary battery, thereby preventing battery cell swelling by detecting a displacement of the gas discharging part, and a system for charging a secondary battery and a method of manufacturing charging a secondary battery.

Technical Solution

According to an exemplary embodiment of the present invention, a secondary battery, which detects a displacement of a gas discharging part and prevents battery cell swelling, includes: a gas discharging part which is positioned at one end of a sealing part that seals an electrode assembly, and induces a discharge of gas, in which the gas discharging part induces the discharge of gas by weakening bonding force compared to other attachment portions of the sealing part.

The gas discharging part may be thicker than other attachment portions of the sealing part by weakly performing thermo-compression compared to other attachment portions of the sealing part.

The secondary battery may further include a detecting part which detects a displacement generated in the gas discharging part and generates an electric signal.

The detecting part may be a strain gauge.

The detecting part may be a piezoelectric element.

The gas discharging part may be thicker than other attachment portions of the sealing part by weakly performing thermo-compression compared to other attachment portions of the sealing part.

The detecting part may be a strain gauge.

According to an exemplary embodiment of the present invention, a system for charging a secondary battery, which detects a displacement of a gas discharging part and prevents battery cell swelling, includes: a gas discharging part which is positioned at one end of a sealing part that seals an electrode assembly, and induces a discharge of gas; a detecting part which detects a displacement generated in the gas discharging part and generates an electric signal; and a control unit which receives the electric signal generated by the detecting part and controls charging of the secondary battery.

The gas discharging part may induce the discharge of gas by weakening bonding force compared to other attachment portions of the sealing part.

The gas discharging part may be thicker than other attachment portions of the sealing part by weakly performing thermo-compression compared to other attachment portions of the sealing part.

The detecting part may be a strain gauge.

The detecting part may be a piezoelectric element.

The control unit may adjust the quantity of current flowing in a charging electrode of the secondary battery according to the electric signal generated in the detecting part.

The control unit may block a charging current according to the electric signal generated in the detecting part.

According to an exemplary embodiment of the present invention, a method of for manufacturing a secondary battery, which detects a displacement of a gas discharging part and prevents battery cell swelling, includes: accommodating an electrode assembly in a battery case; and forming a gas discharging part, which is thicker than other attachment portions, at one end of a sealing part that seals the battery case by weakly performing thermo-compression compared to other attachment portions of the sealing part.

Advantageous Effects

According to one aspect of the present invention, the gas discharging part, which is positioned at one end of a sealing part that seals an electrode assembly and induces a discharge of gas by weakening bonding force more than other attachment portions of the sealing part, and the detecting part which detects a displacement generated in the gas discharging part and generates an electric signal are included, so that it is possible to induce a discharge of gas generated inside a secondary battery, a strain gauge is not directly mounted in the electrode assembly and thus a thickness of the battery is not increased, it is possible to control the quantity of charging current of the battery by detecting a displacement of the gas discharging part, and it is possible to prevent explosion and fire according to a generation of an overcurrent and thus secure stability of the secondary battery.

BRIEF DESCRIPTION OF DRAWINGS

FIG. 1 is a diagram schematically illustrating a secondary battery which detects a displacement of a gas discharging part and prevents battery cell swelling according to an exemplary embodiment of the present invention.

FIG. 2 is a diagram schematically illustrating a sealed state of the gas discharging part in the secondary battery which detects a displacement of a gas discharging part and prevents battery cell swelling according to the exemplary embodiment of the present invention.

FIG. 3 is a diagram schematically illustrating an opened state of the gas discharging part in the secondary battery which detects a displacement of a gas discharging part and prevents battery cell swelling according to the exemplary embodiment of the present invention.

FIG. 4 is a diagram schematically illustrating a system for charging a secondary battery which detects a displacement of a gas discharging part and prevents battery cell swelling according to an exemplary embodiment of the present invention.

MODE FOR CARRYING OUT THE INVENTION

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for a clearer explanation.

Throughout the specification and the claims, unless explicitly described to the contrary, the word "include/comprise" and variations such as "includes/comprises" or "including/comprising" mean further including other constituent elements, not excluding the other constituent elements.

In addition, the term " . . . unit" described in the specification means a unit for processing at least one function and operation and may be implemented by hardware components or software components and combinations thereof.

FIG. 1 is a diagram schematically illustrating a secondary battery 100 which detects a displacement of a gas discharging part and prevents battery cell swelling according to an exemplary embodiment of the present invention.

Referring to FIG. 1, the secondary battery 100 which detects a displacement of a gas discharging part and prevents battery cell swelling according to the exemplary embodiment of the present invention may include a gas discharging part 112 and a detecting part 120. The secondary battery 100 which detects a displacement of the gas discharging part and prevents battery cell swelling illustrated in FIG. 1 is the exemplary embodiment, and constituent elements illustrated in FIG. 1 are not limited to the exemplary embodiment illustrated in FIG. 1, and may be added, changed, or removed as necessary. In the meantime, in the present specification, detailed descriptions of publicly known constituent elements, except for the main configuration, will be omitted.

The gas discharging part 112 may be positioned at one end of a sealing part that seals an electrode assembly and induce a discharge of gas.

The electrode assembly is formed of a cathode plate, an anode plate, and a separator for generating a predetermined current. The electrode assembly has a structure, in which the plurality of cathode plates, separators, and anode plates are sequentially stacked, like an electrode assembly in the related art, and a cathode tap and an anode tap formed at one side of each of the plurality of cathode plates are connected to a cathode terminal 115 and an anode terminal 116 of the battery, respectively.

The battery case 110 may surround the electrode assembly to seal the electrode assembly. The battery case 110 may have a form of a metal can or a pouch. A foil-type metal layer may be formed at an external side of the battery case 110, and one or more polymer layers may be formed at an internal side of the battery case 110.

The battery case 110 may include a sealing part 111 sealing the electrode assembly.

The sealing part 111 may be formed by a thermo-compression method of arranging sealing part contact surfaces 113 to be in contact with each other, heating the sealing part contact surfaces 113, and then applying force to the sealing part contact surfaces 113. In this case, the cathode terminal 115 and the anode terminal 116 of the battery may be exposed to the outside. The sealing part 111 is flatly and evenly formed in a circumference of the battery case 110 to prevent an electrolyte inside the battery from leaking and protect the electrode assembly from an external environment.

The gas discharging part 112 may induce a discharge of gas by weakening bonding force compared to other attachment portions of the sealing part 111. The gas discharging part 112 may be a portion which is designed to prevent gas from leaking through other attachment portions of the sealing part 111 and exclusively allow gas to be discharged.

The bonding force of the attachment portion may be adjusted according to a particular embodiment form in consideration of an internal structure of the electrode assembly, the kind of electrolyte, the quantity of gas and expansion force generated inside the battery, and the like.

The gas discharging part 112 is thermo-compressed at a weaker level than those of other attachment portions of the sealing part 111, so that the gas discharging part 112 may be thicker than other attachment portions. More particularly, when gas discharging part contact surfaces 114 are arranged to be in contact with each other, and then low heat is applied or low force is applied to the gas discharging part contact surfaces 114 compared to other attachment portions of the sealing part 111, or thermo-compression is weakly performed by applying low heat and low force, the gas discharging part 112 may be thicker than other attachment portions of the sealing part 111.

The detecting part 120 may detect a displacement generated in the gas discharging part 112 and generate an electric signal.

When gas is generated by an electrochemical reaction inside the battery, the internal portion of the battery is expanded. The gas discharging part 112 having the relatively lower bonding force than other attachment portions of the sealing part 111 may be opened by the internal expansion force.

FIG. 2 is a diagram schematically illustrating a sealed state of the gas discharging part in the secondary battery which detects a displacement of a gas discharging part and prevents battery cell swelling according to the exemplary embodiment of the present invention.

The detecting part 120 may be a strain gauge. The strain gauge refers to an element which generates an electric signal when a mechanically minimal change is generated. The strain gauge may include all of the materials, elements, and devices, which convert a mechanical change amount into an electric signal, as well as a metal resistance strain gauge and a semiconductor strain gauge.

The detecting part 120 may be a piezoelectric element. The piezoelectric element may include all of the elements which generates an electric signal by using a phenomenon in which electric polarization is present when a mechanical strain occurs.

When the detecting part 120 is mounted in the gas discharging part 112, it is possible to prevent a thickness of the battery from increasing compared to the case where the detecting part is directly mounted in the electrode assembly, and it is possible to more early detect the swelling of the battery cell by converting a displacement of the gas discharging part by the gas generated inside the battery into an electric signal.

FIG. 4 is a diagram schematically illustrating a system 200 for charging a secondary battery which detects a displacement of a gas discharging part and prevents battery cell swelling according to an exemplary embodiment of the present invention.

The system 200 for charging a secondary battery which detects a displacement of a gas discharging part 112 and prevents battery cell swelling according to the exemplary embodiment of the present invention may include a gas discharging part 112, a detecting part 120, and a control unit 130.

The gas discharging part 112 may induce a discharge of gas by weakening bonding force compared to other attachment portions of a sealing part 111.

The gas discharging part 112 is thermo-compressed at a weaker level than those of other attachment portions of the sealing part 111, so that the gas discharging part 112 may be thicker than other attachment portions.

The detecting part 120 may be a strain gauge.

The detecting part 120 may be a piezoelectric element.

The gas discharging part 112 and the detecting part 120 are the same as those described in the secondary battery 100 which detects a displacement of the gas discharging part and prevents battery cell swelling according to the exemplary embodiment of the present invention, so that the detailed description thereof will be omitted.

The control unit 130 may adjust the quantity of current flowing in a charging electrode of the secondary battery according to an electric signal generated in the detecting part 120. The control unit 130 may determine a charging state of the battery and adjust the quantity of charging current based on the electric signal received from the detecting part 120.

For example, when the electric signal received from the detecting part 120 is small, that is, a displacement of the gas discharging part 112 is small, the quantity of gas discharged from the internal side of the battery is small, so that the control unit 130 may control the quantity of charging current flowing in a cathode terminal 115 and an anode terminal 116 which are the charging electrodes to increase.

In contrast, when the electric signal received from the detecting part 120 is large, that is, a displacement of the gas discharging part 112 is large, the quantity of gas discharged from the internal side of the battery is large, so that the control unit 130 may control the quantity of charging current flowing in the cathode terminal 115 and the anode terminal 116 which are the charging electrodes to be decreased.

The control unit 130 may bock the charging current according to the electric signal generated in the detecting part 120. The control unit 130 may include a circuit, which completely blocks the charging current when the electric signal received in the detecting part 120 is larger than a predetermined value. The circuit may be implemented by programmed software or hardware, such as a fuse, and may also be implemented by using both software and hardware.

For example, the control unit 130 may be a system for transmitting a signal to a micro controller unit (MCU) of a battery management system (BMS) and controlling a relay or transmitting a signal to a current blocking device, such as a fuse, and blocking the charging current.

Whether to block the charging current by the control unit 130 when the electric signal exceeds a specific value is not particularly determined, and may be randomly determined in consideration of the quantity of gas generated inside the battery, expansion force, durability of a battery case 110, and an expected life of the battery, and the like, and may be varied according to a particular implementation type.

In comprehensively investing an operation mechanism of the system for charging a secondary battery which detects a displacement of the gas discharging part and prevents battery cell swelling, when the large quantity of gas is discharged from the internal side of the battery and a displacement of the gas discharging part 112 is generated by the internal expansion force, the detecting part 120 generates an electric signal and transmits the generated electric signal to the control unit 130, and the control unit 130 controls a charging current, thereby preventing a risk of explosion and fire of the secondary battery.

A method of manufacturing a secondary battery which detects a displacement of a gas discharging part and prevents battery cell swelling according to an exemplary embodiment of the present invention will be described below.

The method of manufacturing a secondary battery may include accommodating an electrode assembly in a battery case, and then forming a gas discharging part which is thicker than other attachment portions of a sealing part at one end of the sealing part, which seals the battery case, by weakly performing thermo-compression compared to other attachment portions.

A method of forming the electrode assembly may use the foregoing publicly known invention, so that a detailed description thereof will be omitted.

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

The invention claimed is:

1. A secondary battery, comprising:
   a battery case having a sealing part about a periphery of the battery case;
   a gas discharging part which is positioned in the sealing part that seals an electrode assembly, and induces a discharge of gas, the gas discharging part having a first edge and a second edge; and
   a detecting part which detects a displacement generated in the gas discharging part and generates an electric signal, the detecting part being on the sealing part and between the first edge and the second edge of the gas discharging part,
   wherein the gas discharging part induces the discharge of gas by weakening bonding force compared to other attachment portions of the sealing part.

2. The secondary battery of claim 1, wherein the gas discharging part is thicker than other attachment portions of the sealing part by weakly performing thermo-compression on two sheets of material forming the battery case compared to other attachment portions of the sealing part.

3. The secondary battery of claim 1, wherein the detecting part is a strain gauge.

4. The secondary battery of claim 1, wherein the detecting part is a piezoelectric element.

5. A system for charging a secondary battery, the system comprising:
   a battery case having a sealing part about a periphery of the battery case;
   a gas discharging part which is positioned at one end of the sealing part that seals an electrode assembly, and induces a discharge of gas, the gas discharging part having a first edge and a second edge;
   a detecting part which detects a displacement generated in the gas discharging part and generates an electric signal, the detecting part being on the sealing part and between the first edge and the second edge of the gas discharging part; and
   a control unit which receives the electric signal generated by the detecting part and controls charging of the secondary battery.

6. The system of claim 5, wherein the gas discharging part induces the discharge of gas by weakening bonding force compared to other attachment portions of the sealing part.

7. The system of claim 6, wherein the gas discharging part is thicker than other attachment portions of the sealing part by weakly performing thermo-compression on two sheets of material forming the battery case compared to other attachment portions of the sealing part.

8. The system of claim 5, wherein the detecting part is a strain gauge.

9. The system of claim 5, wherein the detecting part is a piezoelectric element.

10. The system of claim 5, wherein the control unit adjusts the quantity of current flowing in a charging electrode of the secondary battery according to the electric signal generated in the detecting part.

11. The system of claim 5, wherein the control unit blocks a charging current according to the electric signal generated in the detecting part.

12. A method of manufacturing a secondary battery, the method comprising:
   accommodating an electrode assembly in a battery case;
   sealing the battery case at a sealing part extending about the periphery of the battery case;
   forming a gas discharging part, which is thicker than other attachment portions, at one end of a sealing part that seals the battery case by weakly performing thermocompression compared to other attachment portions of the sealing part, the gas discharging part having a first edge and a second edge; and placing a detecting part which detects a displacement generated in the gas discharging part and generates an electric signal on the sealing part and between the first edge and the second edge of the gas discharging part.

\* \* \* \* \*